United States Patent [19]

Flamm

[11] Patent Number: 4,667,223

[45] Date of Patent: May 19, 1987

[54] FLESH TONE CORRECTION CIRCUIT

[75] Inventor: Peter M. Flamm, Freiburg, Fed. Rep. of Germany

[73] Assignee: Etutsche ITT Industries GmbH, Freiburg, Fed. Rep. of Germany

[21] Appl. No.: 705,448

[22] Filed: Feb. 25, 1985

[30] Foreign Application Priority Data

Feb. 25, 1984 [DE] Fed. Rep. of Germany ....... 3406889

[51] Int. Cl.4 ............................................... H04N 9/64
[52] U.S. Cl. ...................................................... 358/28
[58] Field of Search .......................................... 358/28

[56] References Cited

U.S. PATENT DOCUMENTS

| | | | |
|---|---|---|---|
| 3,536,827 | 10/1970 | Bell | 358/28 |
| 4,523,221 | 6/1985 | Chin et al. | 358/28 |
| 4,528,586 | 7/1985 | Lewis et al. | 358/28 |
| 4,554,576 | 11/1985 | Kao | 358/28 |
| 4,558,351 | 12/1985 | Fling et al. | 358/28 |

*Primary Examiner*—John W. Shepperd
*Attorney, Agent, or Firm*—Donald J. Lenkszus

[57] ABSTRACT

From the digital color-difference signals (b-y, r-y), the digital flesh-tone correction circuit forms a signal corresponding to the tangent between the two color-difference signals by means of absolute-value stages, a comparator, an intermediate switch, and a divider. In a correction stage, this signal is changed into the address signal for a read-only memory which holds the sine and cosine values of a preset function within a presettable angle correction range. By suitably multiplying the sine and cosine values by the color-difference signals in a multiplier, the flesh-tone-corrected color-difference signals are produced.

8 Claims, 8 Drawing Figures

FLESH TONE CORRECTION CIRCUIT

RELATED APPLICATION

"Flesh Tone Correction Circuit", Ser. No. 578,051, filed Feb. 8, 1984 by Peter M. Flamm et al, and assigned to the same assignee.

BACKGROUND OF THE INVENTION

This invention pertains to an integrated circuit for automatically controlling the flesh tone in NTSC television receivers.

A circuit of this kind is disclosed in "IEEE Transactions on Consumer Electronics", 1979, pages 563 to 576, particularly pages 571 to 573. This circuit corrects each blue-minus-luminance signal value so that the angle included by the vector representing this value and the vector of the ideal flesh tone is halved. The electronic means for achieving this purpose is essentially an operational amplifier used as a voltage follower, and an additional operational amplifier, cf. FIGS. 17 and 18 on page 593 of the above reference. This prior art arrangement is thus suitable for NTSC television receivers equipped with conventional analog signal processing circuitry.

The present invention is directed to the problem of implementing automatic flesh-tone control in NTSC television receivers having digital signal processing circuitry. Digital NTSC television receivers are disclosed, for example, in the "Elektronik", Aug. 14, 1981, pages 27 to 35, and in the "Electronics", Aug. 11, 1981, pages 97 to 103.

SUMMARY OF THE INVENTION

Accordingly, one object of the present invention is to provide an automatic flesh-tone control integrated circuit which is suitable for NTSC television receivers with digital signal processing circuitry and, in addition, permits better compensation or correction than known, analog signal processing circuit.

In accordance with the invention, a fully digital automatic flesh tone control circuit is provided in which the U and V signals are directly corrected and the correction function can be determined by the user. From the digital color-difference signals (b−y, r−y), the digital flesh-tone correction circuit forms a signal corresponding to the tangent between the two color-difference signals by means of absolute-value stages, a comparator, an intermediate switch, and a divider. In a correction stage, this signal is changed into the address signal for a read-only memory which holds the sine and cosine values of a preset function within a presettable angle correction range. By suitably multiplying the sine and cosine values by the color-difference signals in a multiplier, the flesh-tone-corrected color-difference signals are produced.

BRIEF DESCRIPTION OF THE DRAWING

By taking into account the two transmitted and received color-difference signals in the flesh-tone correction, an improved correction behavior of the arrangement is obtained. Furthermore, the television-set manufacturer can preset the intended correction function as a rule for forming address signals, which determines the content of the programmable read-only memory.

First, the subject matter of the aforementioned Flamm et al. application will be explained in more detail with reference to the accompanying drawings, in which.

Figure 5:
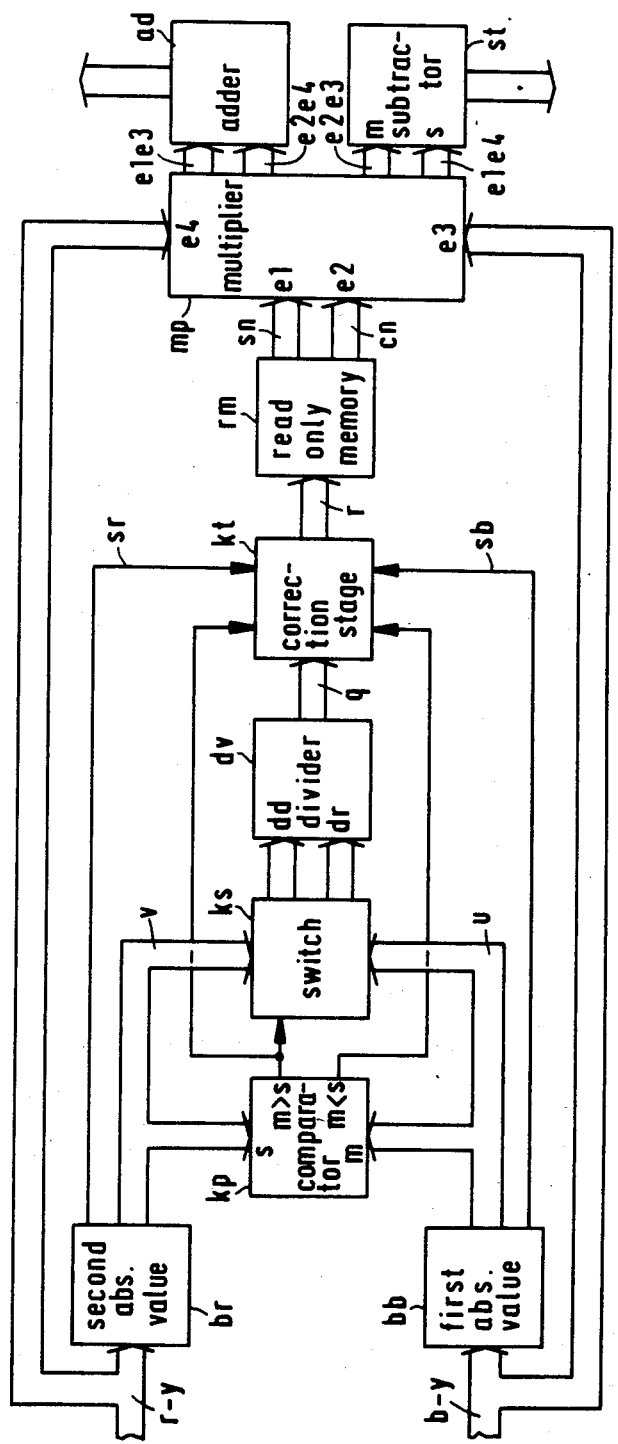
Figure 6:
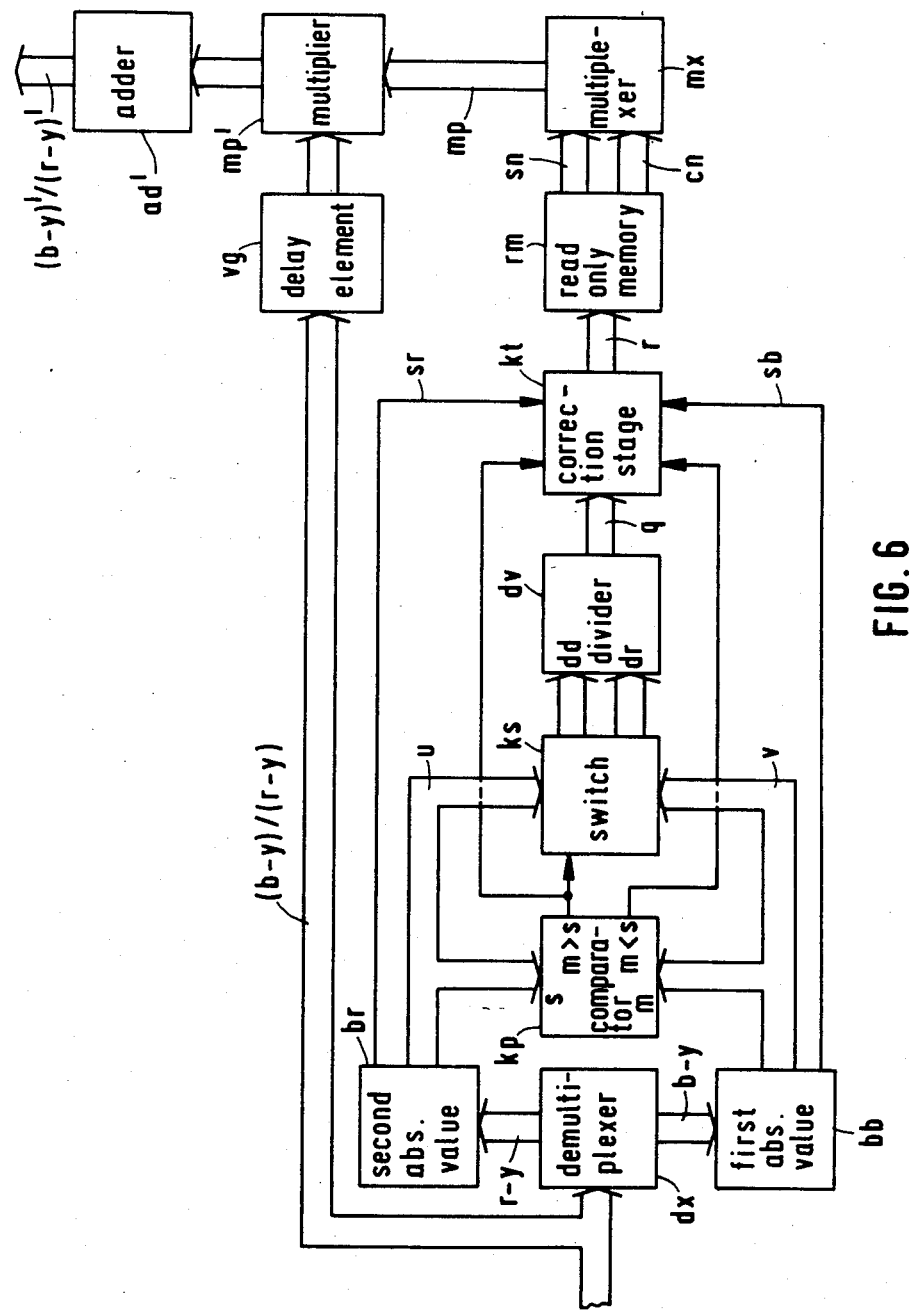
Figure 7:
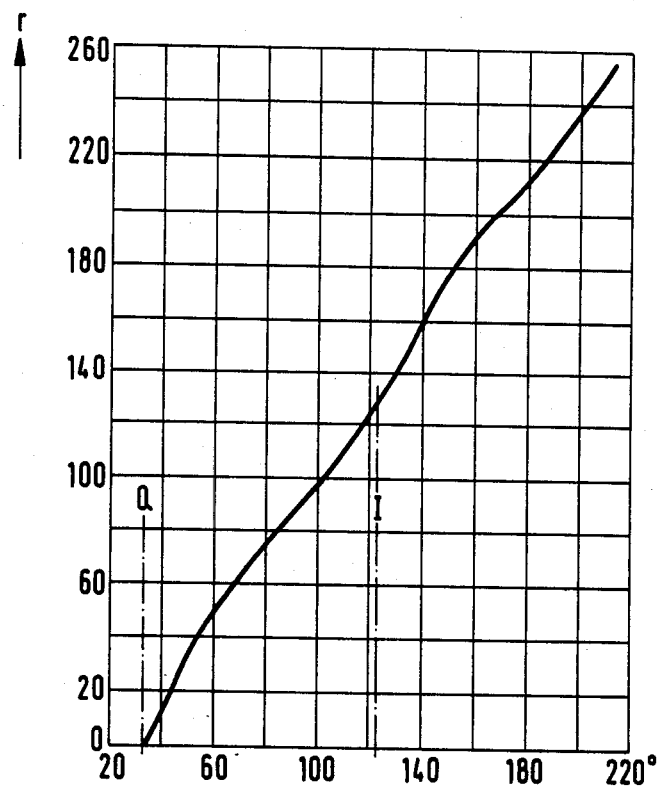
Figure 8:
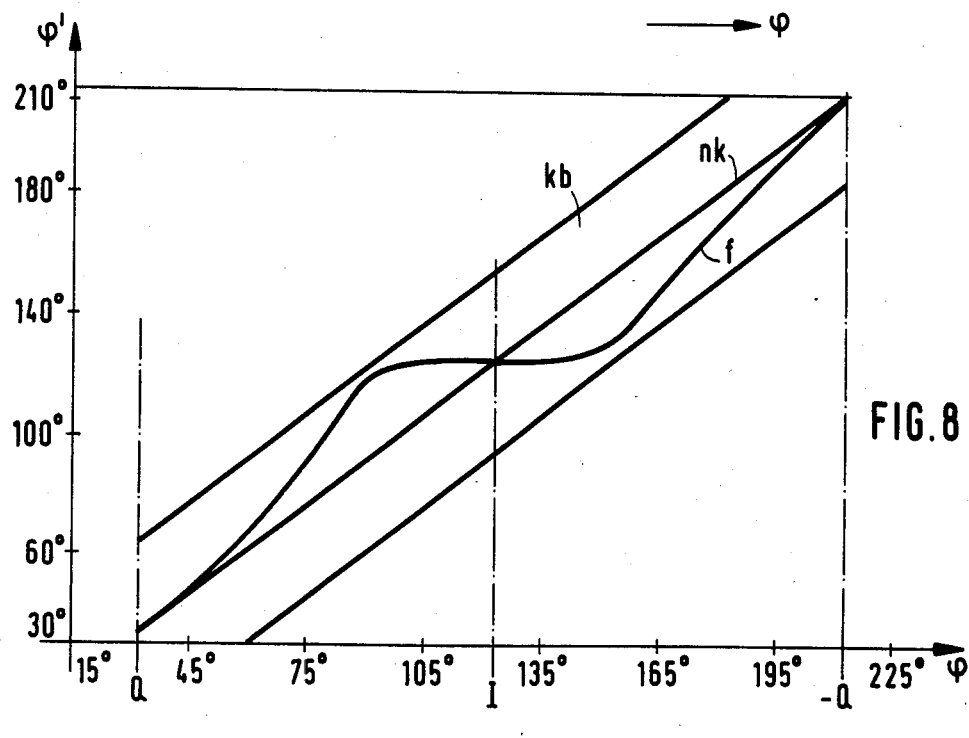

The present invention will be explained with reference to the other figures of the accompanying drawings, in which:

FIG. 5 is a block diagram of an embodiment of the invention;

FIG. 6 is a block diagram of a preferred embodiment of the invention;

FIG. 7 shows the course of the assignment function for the addresses of the read-only memory; and FIG. 8 shows schematically the correction range attainable with the read only memory, and a possible correction function.

DETAILED DESCRIPTION

Figure 1:
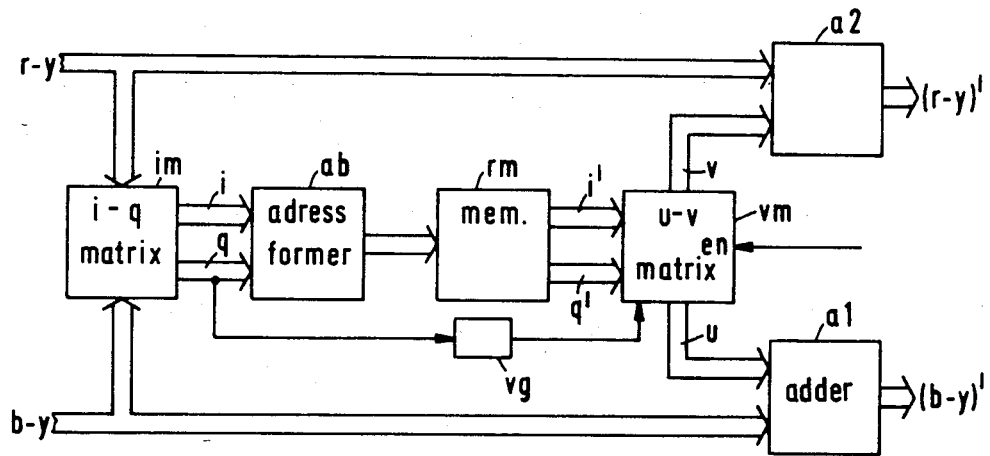
FIG. 1 is a block diagram of an embodiment of the first variant of the Flamm et al. application.

In the figures the stripelike lines indicate that the circuits are firstly, digital circuits and, secondly, circuits processing signals in parallel. In FIG. 1 the input signals are the demodulated digital red-minus-luminance signal r−y and the demodulated digital blue-minus-luminance signal b−y. These digital color-difference signals are generated in a suitable stage of the television receiver in the known manner (cf. "Elektronik", Aug. 14, 1982). The two digital color-difference signals b−y and r−y are fed to the i-q matrix im, which produces the digital i-signal i and the digital q-signal q in accordance with the known equations for analog color-difference signals:

$$I \approx (R-Y) \cos 30° - (B-Y) \sin 30°$$

$$Q \approx (R-Y) \sin 30° + (B-Y) \cos 30°$$

The i-axis is thus practically identical with the vector of the ideal flesh tone.

From the i- and q-signals i, q, the address generator ad forms address address signals suitable for controlling the programmable read-only memory rm. Since only positive i-q signal values are needed, and the correction function is symmetrical with respect to the i-axis, the rule for forming the address signals is as follows:

When the i-signal and the q-signal are positive, their respective values without the respective sign digit are combined into the address signal; when the i-signal is negative, instead of its values, only a corresponding number of zeroes form the address signal, and when the q-signal is negative, the corresponding positive values form the address signal.

The read-only memory rm, which is controlled by the address signal, is so programmed that an address determining in the i-q coordinate system an associated angle a between the i-axis and the vector passing through the original of the i-q coordinate system produces the correcting-signal pair i', q' with a correspondingly corrected angle a', it being possible for the manufacturer of the NTSC television receiver to select and preset the interdependence of the two angles a, a'.

Figure 3:
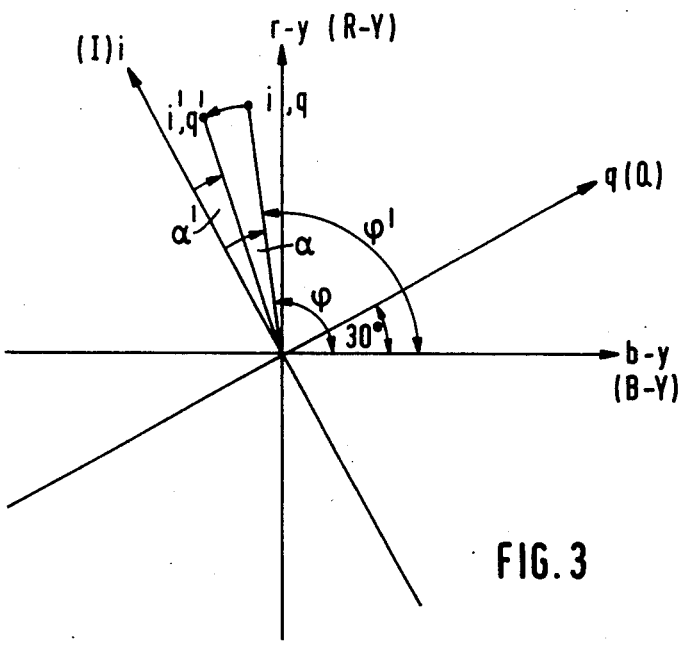
FIG. 3 is a vector diagram making it easier to understand the invention of the Flamm et al. application.

This relationship is shown schematically in FIG. 3.

Figure 4:
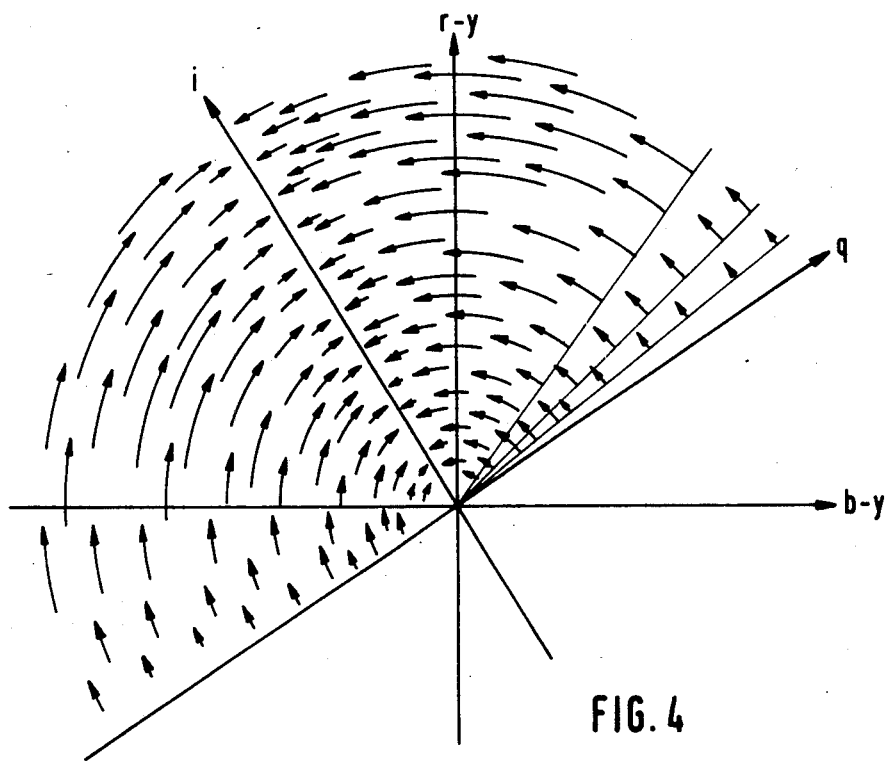
FIG. 4 shows schematically a correction function in a preferred embodiment of the Flamm et al. application.

In a preferred embodiment of the Flamm et al. application, the following function is satisfied for the two angles a, a':

$-40° \leq a < 0°: a' = -a/2$ $0° \leq a \; 40°: a' = a/2$ $40° \leq a \; 50°: a' = 20°$ $-50° < a \; -40°: a' = -20°$ $-90° < a \; -50°: a' = -(90°-a)/2$ $50° \leq a \; 90°: a' = (90°-a)/2$ This function is shown schematically in FIG. 4.

In the embodiment shown in FIG. 1, the programmable read-only memory rm is followed by the u-v matrix vm, which generates the u-signal u and the v-signal v in accordance with the equations $u = i' \cos 30° + q' \sin 30°$ $v = -i' \sin 30° + q' \cos 30°$, i.e., the signals are not transformed back to the system of axes of the color-difference signals. The u-v matrix is also fed, through the delay element vg, with the sign digit of the digital q-signal from the output of the i-q matrix im in order to take the negative q-signal values into account.

The u-signal and the blue-minus-luminance signal b−y are added by the first adder a1, whose output provides the flesh-tone-corrected blue-minus-luminance signal (b−y)'. In similar fashion, the v-signal v and the red-minus-luminance signal r-y are added by the second adder a2 to form the flesh-tone-corrected red-minus-luminance signal (r−y)'.

Figure 2:
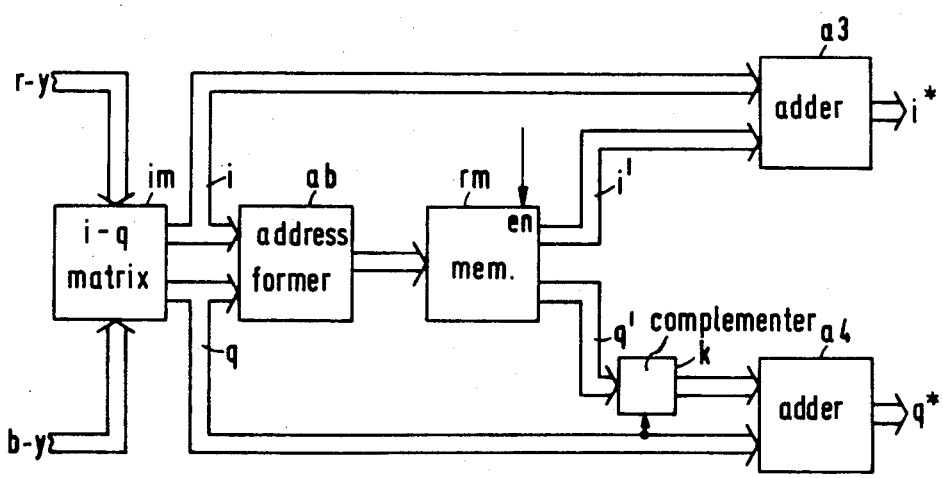
FIG. 2 is a block diagram of an embodiment of the second variant of the Flamm et al. application.

In the embodiment shown in FIG. 2, the u-v matrix vm of FIG. 1 is no longer necessary. The i-signal from the output of the i-q matrix im and the i'-signal from the output of the read-only memory rm are fed to the third adder a3, which thus provides the flesh-tone-corected i-signal i*. In similar fashion, the fourth adder a4 forms the flesh-tone-corrected q-signal q* from the q-signal and the q'-signal. To take into account the sign of the q-signal, which was left out of account during the formation of the correcting signal, the embodiment of FIG. 2 includes a complementer k, which is fed with the q-signal and the sign digit of the q-signal.

The u-v matrix vm of FIG. 1 and the programmable read-only memory rm of FIG. 2 each have an enable inpu en via which the automatic flesh-tone control in accordance with the parent patent can be switched on and off with a suitable digital signal. This is desirable, for example, if the circuit according to the Flamm et al. application is to be used in a multistandard television receiver suitable for receiving both the NTSC standard and other television standards.

In a preferred embodiment of the Flamm et al. application, the i-q matrix and the u-v matrix have a subtracter in the i-branch and the v-branch, respectively and an adder in the q-branch and the u-branch, respectively, to which signals assigned to the numerical values for sin $30° (= 0.5 = 2^{-1})$ and cos $30° (= 0.875 = 2^{-1} + 2^{-2} + 2^{-3})$, respectively, are applied with corresponding shifts.

Through the presence of the i-q matrix im, automatic flesh-tone control can be implemented with much less circuitry than if the color-difference signals b−y and r−y are corrected directly, as is the case with the above-mentioned analog correction circuit described in "IEEE Transactions . . . ". A significant advantage lies in the fact that the area occupied in the integrated circuit by the programmable read-only memory rm is as small as possible, because the symmetry properties of the i-q coordinates can be used to advantage as a result of the transformation of these coordinates. The amount of area required by the i-q matrix and the u-v matrix is smaller than the total area required by the programmable read-only memory rm if the color-difference signals b−y and r−y are corrected directly.

The present invention provides a different solution to the problem of flesh-tone correction. In the embodiment shown in the block diagram of FIG. 5, the digital blue-minus-luminance signal b−y and the digital red-minus-luminance signal r−y are applied to the inputs of the first absolute-value stage bb and the second absolute-value stage br, respectively. These two stages form the absolute value of the signed input signal in a mathematical sense, i.e., they always provide positive signals at their outputs. The output signal u of the first absolute-value stage bb is fed to the minuend input m of the comparator kp, and the output signal v of the second absolute-value stage br to the subtrahend input s of this comparator. These output signals u, v are also applied to the two signal inputs of the electronic intermedite switch ks, whose control input is connected to the minuend-greater-than-subtrahend output m s of the comparator kp.

The two outputs of the intermediate switch ks are coupled to the dividend input dd and the divisor input dr, respectively, of the divider dv. The intermediate switch ks ensures that the numerical value applied to the divisor input dr is always greater than that applied to the dividend input dd, so that the divider operates only within the range between zero and one. This has the advantage that the number of bits of the output signal of the divider dv can be preset with regard to the desired accuracy; in general, it will be equal to or smaller than the number of bits of one of the two input signals. Thus, compared with the number of stages of a divider in which the condition "divisor greater than dividend" is not satisfied, the number of stages of the divider dv is substantially reduced. Another factor contributing to this reduction of the number of stages is that, thanks to the absolute-value stages bb, br, only positive numbers have to be processed in the divider dv.

The output signal q of the divider dv is fed to the signal input of the correction stage kt, which is also presented with the sign signals sb, sr of the digital color-difference signals b−y, r−y, and which is also connected to the minuend-greater-than-subtrahend output m<s and the minuend-smaller-than-subtrahend output m>s of the comparator kp. The sign signals sb, sr are supplied by the absolute-value stages bb, br.

The correction stage kt generates the address signal r for the read-only memory rm in accordance with the folloing table:

|  | sb | sr | u > v | u < v | r(decimal) |
|---|---|---|---|---|---|
| $0° \leq \phi \leq 33°$ | 0 | 0 | 1 | 0 | 0 |
| $33° < \phi < 45°$ | 0 | 0 | 1 | 0 | z(q − t) |
| $45°$ | 0 | 0 | 0 | 0 | z(1 − t) |
| $45° < \phi \leq 90°$ | 0 | 0 | 0 | 1 | z(1 + t − q) |
| $90° < \phi < 135°$ | 1 | 0 | 0 | 1 | z(1 + t − q) |

-continued

| | sb | sr | u > v | u < v | r(decimal) |
|---|---|---|---|---|---|
| 135° | 1 | 0 | 0 | 0 | z(2 + t) |
| 135° < φ ≦ 180° | 1 | 0 | 1 | 0 | z(3 + t − q) |
| 180° < φ ≦ 213° | 1 | 1 | 1 | 0 | z(3 + t + q) |
| 213° < φ < 225° | 1 | 1 | 1 | 0 | 0 |
| 225° | 1 | 1 | 0 | 0 | 0 |
| 225° < φ ≦ 270° | 1 | 1 | 0 | 1 | 0 |
| 270° < φ < 315° | 0 | 1 | 0 | 1 | 0 |
| 315° | 0 | 1 | 0 | 0 | 0 |
| 315° < φ ≦ 360° | 0 | 1 | 1 | 0 | 0 | where $t = \tan 33°$, $z = 2^{n-2}$ and $n = ldr_{max}$

In the (b−y)−(r−y) coordinate system of FIG. 3, where the (b−y) axis is the abscissa, the angle φ is the angle from the abscissa in the counterclockwise, positive direction.

The columns sb, sr of the table contain the values in the sign positions of the digital color-difference signals b−y, r−y in the usual two's complement representation of real numbers in the binary system. "0" thus signifies a positive number, and "1" a negative number. In the columns u>v and u<v, "1" signifies that u is greater and smaller, respectively, than v. In the last column of the table, the address number r of the programmable read-only memory rm is given in decimal notation. For simplicity, it is assumed in accordance with the condition $n = ldr_{max}$ that the number $r_{max}$ of memory addresses is a power of two. Thus, if the number of addresses is $2^7 = 256$, for example, then $z = 2^{n-2} = 64$.

FIG. 7 shows the course of the assignment function between the angle φ and the address number r for the case $n = 7$, i.e., $r_{max} = 256$, this function being defined by the table. The factor $t = \tan 33°$ takes into account that the angle between the (b−y)-axis and the q-axis is precisely 33°.

The read-only memory rm holds sine and cosine values sn, cn of the predetermined function f within an angle correction range kb which is symmetrical with respect to the zero correction line nk and must be preset.

This is illustrated schematically in FIG. 8. In this plot, the abscissa measures the angle φ, and the ordinate measures the corrected angle φ'. The zero correction line nk connects identical angular values of φ and φ'. The upper and lower limits of the angle correction range kb run parallel to the zero correction line nk, and the predetermined function f for changing the individual angular values φ into the corrected angular values φ' runs within this range. One of these possible functions f is shown in FIG. 8. It can be seen from this figure that, the correction takes place only for positive I-values, because the function f runs between Q and −Q, which corresponds to the abscissa in the I-Q coordinate system of FIG. 3.

The sine and cosine outputs of the read-only memory rm are connected to the first input e1 and the second input e2, respectively, of the multiplier mp, whose third input e3 and fourth input e4 are presented with the digital color-difference signals b−y and r−y, respectively. The multiplier mp forms only four of the possible products, namely, e1e3, e1e4, e2e3 and e2e4, which appear at its four outputs separately. The two products e1e3 and e2e4 are fed to the adder ad, while the products e2e3 and e1e4 are applied to the minuend input m and the subtrahend input s, respectively, of the subtractor st. The output of the adder ad provides the flesh-tone-corrected digital red-minus-luminance signal $$(r-y)' = (b-y)\sin(\phi'-\phi) + (r-y)\cos(\phi'-\phi),$$

and the output of the subtractor st provides the corresponding blue-minus-luminance signal $$(b-y)' = (b-y)\cos(\phi'-\phi) - (r-y)\sin(\phi'-\phi).$$

FIG. 6 shows a block diagram of a preferred embodiment of the invention if a digital time-division-multiplex color-difference signal (b−y)/(r−y) must be processed. The demultiplexer dx separates this signal into the two digital color-difference signals b−y, r−y, which are then fed to the two absolute-value stages bb, br like in the arrangement of FIG. 5. The signal processing up to the output of the read-only memory rm corresponds to that in the arrangement of FIG. 5. The sine and cosine outputs of the read-only memory rm of FIG. 6 are coupled to the two inputs of the multiplexer mx, which recombines these two signals into a time-division-multiplex signal. The latter is applied to the first input of the multiplier mp', which forms the four products e1e3, e1e4, e2e3, and e2e4 on a time-division-multiplex basis. The time-division-multiplex color-difference signal (b−y)−(r−y) is fed to the second input of the multiplier mp' through the delay elemment vg. The time delay produced by the delay element vg is approximately equal to the propagation delay between the input of the demultiplexer dx and the output of the multiplexer mx; thus, signal values precisely correlated in time are applied to the two inputs of the multiplier mp'. The output of the multiplier mp' is coupled to the input of the adder ad', which produces the flesh-tone-corrected time-division-multiplex color-difference signal (b−y)'/(r−y)'. This is done according to the equations given in connection with FIG. 5 for the flesh-tone-corrected difference signals (b−y)',(r−y)'.

In a practical embodiment of the invention, the programmable read-only memory rm is designed for the above-mentioned 256 addresses. The angle correction range kb is ±28°. The sine values lie within ±0.5, which corresponds to the numbers 11000000 to 00111111 in the binary two's complement. Only seven bits are required for the sine values in the read-only memory.

For the cosine values, which lie between 0.875 and 1, corresponding to binary 01110000 to 01111111, only four digits are necessary. In the practical embodiment mentioned above, the read-only memory rm thus has 11 bits for each of the 256 addresses.

What is claimed is:
1. A digital flesh-tone correction circuit comprising:
 first inputs receiving demodulated digital first color difference signals;
 second inputs receiving demodulated digital second color difference signals;
 first circuit means for forming first signals corresponding to ratios between said first and second color difference signals;
 second circuit means responsive to said first signals for generating memory address signals;
 memory means storing the sine and cosine values of a predetermined function within a presettable angle correction range and responsive to said memory address signals for reading corresponding sine and cosine values; and means for multiplying said sine and cosine values read from said memory means by said first and second color difference signals to produce products and for arithmetically combining said products to produce flesh-tone-corrected color diffence signals;

said second circuit means generating said memory address signals r such that for a given angle $\phi$ the following relationships are used:

| | sb | sr | uv | uv | r |
|---|---|---|---|---|---|
| $0° \leq 4 \leq 33°$ | 0 | 0 | 1 | 0 | 0 |
| $33° < 4 < 45°$ | 0 | 0 | 1 | 0 | z(q − t) |
| $45° = 4$ | 0 | 0 | 0 | 0 | z(1 − t) |
| $45° < 4 \leq 90°$ | 0 | 0 | 0 | 1 | z(1 + t − q) |
| $90° < 4 < 135°$ | 1 | 0 | 0 | 1 | z(1 + t + q) |
| $135° = 4$ | 1 | 0 | 0 | 0 | z(2 + t) |
| $135° < 4 \leq 180°$ | 1 | 0 | 1 | 0 | z(3 + t − q) |
| $180° < 4 \leq 213°$ | 1 | 1 | 1 | 0 | z(3 + t + q) |
| $213° < 4 < 225°$ | 1 | 1 | 1 | 0 | 0 |
| $225° = 4$ | 1 | 1 | 0 | 0 | 0 |
| $225° < 4 \leq 270°$ | 1 | 1 | 0 | 1 | 0 |
| $270° < 4 < 315°$ | 0 | 1 | 0 | 1 | 0 |
| $315° = 4$ | 0 | 1 | 0 | 0 | 0 |
| $315° < 4 \leq 360°$ | 0 | 1 | 1 | 0 | 0 | where t=tan 33°; $z=2^{n-2}$; n=ldr(max); u=said first color difference signal; v=said second color difference signal; sb=sign of said first color difference signal, and sr=sign of said second color difference signal.

2. A digital flesh-tone correction circuit in accordance with claim 1 wherein:
said first circuit means comprises:
a first absolute value circuit for forming the absolute value of said first color difference signals;
a second absolute value circuit for forming the absolute value of said second color difference signals;
a comparator for comparing the absolute value of said first and second color difference signals to generate a control signal;
a divider circuit having a dividend input, a division input and an output at which said first signals are generated; and
switch means responsive to said control signal for coupling the absolute value of said first color difference signals to one of said dividend or divisor inputs and for coupling the absolute value of said second color difference signals to the other of said dividend or divisor inputs.

3. A digital flesh-tone correction circuit comprising:
first inputs receiving demodulated digital first color difference signals; second inputs receiving demodulated digital second color difference signals;
first circuit means for dividing the absolute value of one of said first or second color difference signals by the other of said first or second color difference signals to generate quotient signals;
correction circuit means for generating address signals from said quotient signals;
memory means for storing sine and cosine values of corresponding a correction angle determined by a predetermined function and/or providing sine and cosine values in response to address signals;
means for multiplying said first and second color difference signals each by said sine and cosine signals to produce first, second, third, and fourth intermediate signals;
means for arithmetically combining two of said first, second, third and fourth intermediate signals to produce a flesh-tone corrected digital red-minus-luminous signal and for combining the other two of said first, second, third and fourth intermediate signals to produce flesh-tone corrected digital blue-minus-luminous signals;

said second circuit means generating said memory address signals r such that for a given angle $\phi$ the following relationships are used:

| | sb | sr | uv | uv | r |
|---|---|---|---|---|---|
| $0° \leq 4 \leq 33°$ | 0 | 0 | 1 | 0 | 0 |
| $33° < 4 < 45°$ | 0 | 0 | 1 | 0 | z(q − t) |
| $45° = 4$ | 0 | 0 | 0 | 0 | z(1 − t) |
| $45° < 4 \leq 90°$ | 0 | 0 | 0 | 1 | z(1 + t − q) |
| $90° < 4 < 135°$ | 1 | 0 | 0 | 1 | z(1 + t + q) |
| $135° = 4$ | 1 | 0 | 0 | 0 | z(2 + t) |
| $135° < 4 \leq 180°$ | 1 | 0 | 1 | 0 | z(3 + t − q) |
| $180° < 4 \leq 213°$ | 1 | 1 | 1 | 0 | z(3 + t + q) |
| $213° < 4 < 225°$ | 1 | 1 | 1 | 0 | 0 |
| $225° = 4$ | 1 | 1 | 0 | 0 | 0 |
| $225° < 4 \leq 270°$ | 1 | 1 | 0 | 1 | 0 |
| $270° < 4 < 315°$ | 0 | 1 | 0 | 1 | 0 |
| $315° = 4$ | 0 | 1 | 0 | 0 | 0 |
| $315° < 4 \leq 360°$ | 0 | 1 | 1 | 0 | 0 | where t=tan 33°; $z=2^{n-2}$; n=ldr(max); u=said first color difference signal; v=said second color difference signal; sb=sign of said first color difference signal, and sr=sign of said second color difference signal.

4. A digital flesh-tone correction circuit comprising:
a demultiplexer receiving time division multiplexed demodulated digital first color difference signals and demodulated digital second color difference signals for generating first color difference signals at first terminals and second color difference signals at a second terminal;
first circuit means for dividing the absolute value of one of said first or second color difference signals by the other of said first or second color difference signals to generate quotient signals;
memory means for storing sine and cosine values corresponding to a correction angle determined by a predetermined function and for providing sine and cosine values in response to said address signals;
multiplexing means for time division multiplexing said sine and cosine values;
means receiving said time division multiplexed first and second color difference signals and said time division multiplexed sine and cosine values for combining said time division multiplexed color difference signals and said time division multiplexed sine and cosine vlaues to produce time division multiplexed first, second, third and fourth intermediate signals; and
means for arithmetically said time division multiplexed first, second, third and fourth signals to produce time-division multiplexed flesh-tone corrected digital first and second color difference signals;
said second circuit means generating said memory address signals r such that for a given angle $\phi$ the following relationships are used:

| | sb | sr | uv | uv | r |
|---|---|---|---|---|---|
| $0° \leq 4 \leq 33°$ | 0 | 0 | 1 | 0 | 0 |
| $33° < 4 < 45°$ | 0 | 0 | 1 | 0 | z(q − t) |
| $45° = 4$ | 0 | 0 | 0 | 0 | z(1 − t) |

-continued

| | sb | sr | uv | uv | r |
|---|---|---|---|---|---|
| 45° < 4 ≦ 90° | 0 | 0 | 0 | 1 | z(1 + t − q) |
| 90° < 4 < 135° | 1 | 0 | 0 | 1 | z(1 + t + q) |
| 135° = 4 | 1 | 0 | 0 | 0 | z(2 + t) |
| 135° < 4 ≦ 180° | 1 | 0 | 1 | 0 | z(3 + t − q) |
| 180° < 4 ≦ 213° | 1 | 1 | 1 | 0 | z(3 + t + q) |
| 213° < 4 < 225° | 1 | 1 | 1 | 0 | 0 |
| 225° = 4 | 1 | 1 | 0 | 0 | 0 |
| 225° < 4 ≦ 270° | 1 | 1 | 0 | 1 | 0 |
| 270° < 4 < 315° | 0 | 1 | 0 | 1 | 0 |
| 315° = 4 | 0 | 1 | 0 | 0 | 0 |
| 315° < 4 ≦ 360° | 0 | 1 | 1 | 0 | 0 | where $t = \tan 33°$; $z = 2^{n-2}$; $n = \text{ldr}(\max)$; u = said first color difference signal; v = said second color difference signal; sb = sign of said first color difference signal, and sr = sign of said second color difference signal.

5. A digital flesh-tone correction circuit comprising:
first inputs receiving demodulated digital first color difference signals;
second inputs receiving demodulated digital second color difference signals;
first circuit means for forming first signals corresponding to the tangents between said first and second color difference signals;
second circuit means responsive to said first signals for generating memory address signals;
memory means storing predetermined trigonometric values of a predetermined function within a presettable angle correction range and responsive to said memory address signals for reading correspond predetermined trigonometric values; and
means for multiplying said sine and cosine values read from said memory means by said first and second color difference signals to produce products and for arithmetically combining said products to produce flesh-tone-corrected color difference signals;

| | sb | sr | uv | uv | r |
|---|---|---|---|---|---|
| 0° ≦ 4 ≦ 33° | 0 | 0 | 1 | 0 | 0 |
| 33° < 4 < 45° | 0 | 0 | 1 | 0 | z(q − t) |
| 45° = 4 | 0 | 0 | 0 | 0 | z(1 − t) |
| 45° < 4 ≦ 90° | 0 | 0 | 0 | 1 | z(1 + t − q) |
| 90° < 4 < 135° | 1 | 0 | 0 | 1 | z(1 + t + q) |
| 135° = 4 | 1 | 0 | 0 | 0 | z(2 + t) |
| 135° < 4 ≦ 180° | 1 | 0 | 1 | 0 | z(3 + t − q) |
| 180° < 4 ≦ 213° | 1 | 1 | 1 | 0 | z(3 + t + q) |
| 213° < 4 < 225° | 1 | 1 | 1 | 0 | 0 |
| 225° = 4 | 1 | 1 | 0 | 0 | 0 |
| 225° < 4 ≦ 270° | 1 | 1 | 0 | 1 | 0 |
| 270° < 4 < 315° | 0 | 1 | 0 | 1 | 0 |
| 315° = 4 | 0 | 1 | 0 | 0 | 0 |
| 315° < 4 ≦ 360° | 0 | 1 | 1 | 0 | 0 | where $t = \tan 33°$; $z = 2^{n-2}$; $n = \text{ld } r(\max)$; u = said first color difference signal; v = said second color difference signal; sb = sign of said first color difference signal, and sr = sign of said second color difference signal.

6. A digital flesh-tone correction circuit in accordance with claim 5 wherein:
said first circuit means comprises:
a first absolute value circuit for forming the absolute value of said first color difference signals;
a second absolute value circuit for forming the absolute value of said second color difference signals;
a comparator for comparing the absolute value of said first and second color difference signals to generate a control signal;
a divider circuit having a dividend input, a division input and an output at which said first signals are generated; and
switch means responsive to said control signal for coupling the absolute value of said first color difference signals to one of said dividend or divisor inputs and for coupling the absolute value of said second color difference signals to the other of said dividend or divisor inputs.

7. A digital flesh-tone correction circuit comprising:
first inputs receiving demodulated digital first color difference signals; second inputs receiving demodulated digital second color difference signals;
first circuit means for dividing the absolute value of one of said first or second color difference signals by the other of said first or second color difference signals to generated quotient signals;
correction circuit means for generating address signals from said quotient signals,
memory means for storing trigonometric values corresponding to a correction angle determined by a predetermined function and/or providing trigonometric values in response to said address signals;
means for multiplying said first and second color difference signals each by said trigonometric signals to produce first, second, third, and fourth intermediate signals;
means for arithmetically combining two of said first, second, third and fourth intermediate signals to produce a flesh-tone corrected digital red-minus-luminous signal and for arithmetically combining the other two of said first, second, third and fourth intermediate signals to produce flesh-tone corrected digital blue-minus-luminous signals;
said correction circuit means generating said memory address signals r such that for a given angle $\phi$ the following relationships are used:

| | sb | sr | uv | uv | r |
|---|---|---|---|---|---|
| 0° ≦ 4 ≦ 33° | 0 | 0 | 1 | 0 | 0 |
| 33° < 4 < 45° | 0 | 0 | 1 | 0 | z(q − t) |
| 45° = 4 | 0 | 0 | 0 | 0 | z(1 − t) |
| 45° < 4 ≦ 90° | 0 | 0 | 0 | 1 | z(1 + t − q) |
| 90° < 4 < 135° | 1 | 0 | 0 | 1 | z(1 + t + q) |
| 135° = 4 | 1 | 0 | 0 | 0 | z(2 + t) |
| 135° < 4 ≦ 180° | 1 | 0 | 1 | 0 | z(3 + t − q) |
| 180° < 4 ≦ 213° | 1 | 1 | 1 | 0 | z(3 + t + q) |
| 213° < 4 < 225° | 1 | 1 | 1 | 0 | 0 |
| 225° = 4 | 1 | 1 | 0 | 0 | 0 |
| 225° < 4 ≦ 270° | 1 | 1 | 0 | 1 | 0 |
| 270° < 4 < 315° | 0 | 1 | 0 | 1 | 0 |
| 315° = 4 | 0 | 1 | 0 | 0 | 0 |
| 315° < 4 ≦ 360° | 0 | 1 | 1 | 0 | 0 | where $r = \tan 33°$; $z = 2^{n-2}$; $n = \text{ldr}(\max)$; u = said first color difference signal; v = said second color difference signal; sb = sign of said first color difference signal, and sr = sign of said second color difference signal.

8. A digital flesh-tone correction circuit comprising:
a demultiplexer receiving time division multiplexed demodulated digital first color difference signals and demodulated digital second color difference signals for generating first color difference signals at first terminals and second clor difference signals at a second terminal;

first circuit means for dividing the absolute value of one of said first or second color difference signals by the other of said first or second color difference signals to generate quotient signals;

memory means for storing trigonometric values corresponding to a correction angle determined by a predetermined function and for providing trigonometric values in response to said address signals;

multiplexing means for time division multiplexing said trigonometric values;

means receiving said time division multiplexed first and second color difference signals and said time division multiplexed trigonometric values for combining said time division multiplexed color difference signals and said time division multiplexed trigonometric values to produce time division multiplexed first, second, third and fourth intermediate signals; and wherein said predetermined function is determined for a given angle $\phi$ as follows:

| | sb | sr | uv | uv | r |
|---|---|---|---|---|---|
| $0° \leq \phi \leq 33°$ | 0 | 0 | 1 | 0 | 0 |
| $33° < \phi < 45°$ | 0 | 0 | 1 | 0 | $z(q - t)$ |
| $45° = \phi$ | 0 | 0 | 0 | 0 | $z(1 - t)$ |
| $45° < \phi \leq 90°$ | 0 | 0 | 0 | 1 | $z(1 + t - q)$ |
| $90° < \phi < 135°$ | 1 | 0 | 0 | 1 | $z(1 + t + q)$ |
| $135° = \phi$ | 1 | 0 | 0 | 0 | $z(2 + t)$ |
| $135° < \phi \leq 180°$ | 1 | 0 | 1 | 0 | $z(3 + t - q)$ |
| $180° < \phi \leq 213°$ | 1 | 1 | 1 | 0 | $z(3 + t + q)$ |
| $213° < \phi < 225°$ | 1 | 1 | 1 | 0 | 0 |
| $225° = \phi$ | 1 | 1 | 0 | 0 | 0 |
| $225° < \phi \leq 270°$ | 1 | 1 | 0 | 1 | 0 |
| $270° < \phi < 315°$ | 0 | 1 | 0 | 1 | 0 |
| $315° = \phi$ | 0 | 1 | 0 | 0 | 0 |
| $315° < \phi \leq 360°$ | 0 | 1 | 1 | 0 | 0 | where $t = \tan 33°$; $z = 2^{n-2}$; $n = \text{ldr}(\max)$; $u =$ said first color difference signal; $v =$ said second color difference signal; $sb =$ sign of said first color difference signal, and $sr =$ sign of said second color difference signal.

* * * * *